United States Patent
Pedone et al.

(10) Patent No.: US 6,772,363 B2
(45) Date of Patent: Aug. 3, 2004

(54) FAST FAILOVER DATABASE TIER IN A MULTI-TIER TRANSACTION PROCESSING SYSTEM

(75) Inventors: Fernando Pedone, San Mateo, CA (US); Svend Frolund, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 09/804,954

(22) Filed: Mar. 12, 2001

(65) Prior Publication Data

US 2002/0129294 A1 Sep. 12, 2002

(51) Int. Cl.[7] .................................................. G06F 11/00
(52) U.S. Cl. .............................. 714/4; 714/6; 714/15; 707/201; 707/202
(58) Field of Search ............................ 714/4, 6, 15, 16, 714/19; 707/201, 202; 709/203, 101; 718/203, 101

(56) References Cited

U.S. PATENT DOCUMENTS

| | | | | |
|---|---|---|---|---|
| 5,781,910 A | * | 7/1998 | Gostanian et al. ........... | 707/201 |
| 5,796,934 A | * | 8/1998 | Bhanot et al. ................. | 714/4 |
| 6,154,847 A | * | 11/2000 | Schofield et al. .............. | 714/4 |
| 6,199,069 B1 | * | 3/2001 | Dettinger et al. ........... | 707/202 |
| 6,223,231 B1 | * | 4/2001 | Mankude ..................... | 710/38 |
| 6,374,243 B1 | * | 4/2002 | Kobayashi et al. ............ | 707/8 |
| 6,421,688 B1 | * | 7/2002 | Song ......................... | 707/203 |
| 6,449,734 B1 | * | 9/2002 | Shrivastava et al. .......... | 714/15 |
| 6,493,726 B1 | * | 12/2002 | Ganesh et al. .............. | 707/201 |
| 6,564,336 B1 | * | 5/2003 | Majkowski .................... | 714/4 |
| 6,609,136 B2 | * | 8/2003 | Bamford et al. ............ | 707/202 |

* cited by examiner

Primary Examiner—Robert Beausoliel
Assistant Examiner—Yolanda L Wilson

(57) ABSTRACT

Methods of processing transactions in a multi-tier network of at least one database client and a plurality of database servers including a primary and a backup database server are described. One method includes the step of concurrently executing a plurality of transactions including a selected transaction on a first database server during an epoch exclusively identifying the first database server as a primary. The selected transaction is committed on the first database server in response to a commit request, if the commit request is encountered before the epoch is changed. The selected transaction is broadcast to a second database server for non-concurrent execution. The selected transaction is committed on the second database server if execution is completed and the epoch has not changed.

13 Claims, 13 Drawing Sheets

410

TO EXECUTE SUBMIT(J)....

1: $p_a = 0$
2:    FIND_PRIMARY_FLAG = TRUE
3:    REPEAT
4:       REPEAT
5:          REQUEST = FIRST REQUEST OF $t$
6:          IF FIND_PRIMARY_FLAG = TRUE THEN
7:             $p_a = (p_a \text{ MOD } N) + 1$
8:          SEND ($t$, REQUEST) TO $p_a$
9:          WAIT UNTIL (RECEIVE ($t$, RESULT FROM $p_a$) OR SUSPECT($p_a$)
10:         IF NOT (RECEIVED($t$, RESULT) FROM $p_a$ THEN
11:             SEND($t$, ABORT($t$)) TO $p_a$
12:       UNTIL (RECEIVED ($t$, RESULT) FROM $p_a$) AND (RESULT $\neq$ "NOT PRIMARY")
13:       FIND_PRIMARY_FLAG = FALSE
14:
15:       REPEAT
16:          REQUEST = JOB(RESULT)
17:          SEND ($t$, REQUEST) TO $p_a$
18:          WAIT UNTIL (RECEIVE($t$, RESULT) OR SUSPECT($p_a$)
19:          IF NOT (RECEIVED($t$, RESULT) FROM $p_a$) THEN
20:             SEND ($t$, ABORT($t$)) TO $p_a$
21:             RESULT = ABORT
22:             FIND_PRIMARY_FLAG = TRUE
23:       UNTIL (RESULT = COMMIT) OR (RESULT = ABORT)
24:    UNTIL (REQUEST = ABORT) OR (REQUEST = COMMIT AND RESULT $\neq$ ABORT)
25:    RESPONSE(RESULT)

```
1:   'INITIALIZATION FOR DB SERVER d_j
2:   e_j = 1
3:   p_j = 1
4:
5:   'TRANSACTION EXECUTION
6:   WHEN RECEIVE REQUEST FROM a_i
7:       CASE REQUEST = BEGIN(T):
8:           IF d_j ≠ p_j THEN
9:               SEND (t, "NOT PRIMARY") TO a_i
10:          ELSE
11:              STATE(t) = EXECUTING
12:              BEGIN(t)
13:              WAIT FOR RESPONSE(t, RESULT)
14:              SEND (t, RESULT) TO a_i
15:      CASE (REQUEST = EXECUTE(t, SQL-ST)) AND (STATE(t) = EXECUTING):
16:          EXEC TASK
17:              EXEC(t, SQL-ST)
18:              WAIT FOR RESPONSE(t, RESULT)
19:              IF RESULT = ABORTED THEN STATE(t) = ABORTED
20:              SEND(t, RESULT) TO a_i
21:      CASE(REQUEST = COMMIT(t)) AND (STATE(t) = EXECUTING):
22:          STATE(t) = COMMITTING
23:          SQLSEQ(t) = ALL EXEC(t, SQL-ST) STATEMENTS IN ORDER
24:          BROADCAST(d_j, e_j, a_i, t, SQLSEQ(t))
25:      CASE(REQUEST = ABORT(t)) AND (STATE(t) = EXECUTING):
26:          STATE(t) = ABORTED
27:          ABORT(t)
```

```
27:  'COMMIT TRANSACTION t
28:  WHEN DELIVER($d_j$, $e_j$, $a_j$, t, SQLSEQ(t))
29:      IF $e_j$ < $e_i$ THEN
30:              STATE(t) = ABORTED
31:              ABORT(t)
32:      ELSE
33:              IF $d_j$ ≠ $p_j$ THEN
34:                      STATE(t) = COMMITTING
35:                      BEGIN(t)
36:                      FOR EVERY EXEC(t, SQL-ST) IN SQLSEQ(t) DO
37:                              EXEC(t, SQL-ST)
38:                              WAIT FOR RESPONSE(t, RESULT)
39:              COMMIT(t)
40:              WAIT FOR RESPONSE(t, RESULT)
41:              STATE(t) = COMMITTED
42:              SEND (t, STATE(t)) TO $a_j$
43:
44:  'REQUEST EPOCH CHANGE
45:  WHEN SUSPECT($p_j$)
46:      BROADCAST($e_j$, "NEW EPOCH")
47:
48:  'ACT ON REQUESTED EPOCH CHANGE
49:  WHEN DELIVER($e_j$, "NEW EPOCH") AND ($e_j$ = $e_j$)
50:      IF $p_j$ = $d_j$ THEN
51:              FOR EVERY t SUCH THAT STATE(t) = EXECUTING DO
52:                      STATE(t) = ABORTED
53:                      ABORT(t)
54:                      SEND(t, ABORTED) TO $a_j$
55:      $p_j$ = ($e_j$ MOD N) + 1
56:      $e_j$ = $e_j$ + 1
```

FIG. 11

FAST FAILOVER DATABASE TIER IN A MULTI-TIER TRANSACTION PROCESSING SYSTEM

FIELD OF THE INVENTION

This invention relates to the field of distributed transactional processing. In particular, this invention is drawn to improving database availability in a multi-tier transaction processing system.

BACKGROUND OF THE INVENTION

Internet commerce applications are typically distributed applications with at least a three tier architecture. One tier handles presentation (e.g., the user interface), another tier handles the logic of the application, and yet another tier handles the data. Clients (e.g., browser software) handle the presentation. Application servers such as web servers handle the core logic of the application, but are otherwise stateless. A database contains the data and the state of the application. Application servers processes a client submitted request and store a resulting state in the database. The application server then returns a result to the client. This architecture has become prevalent with the advent of commerce on the Internet.

The database tier tends to be the greatest availability bottleneck in the three tier architecture. One approach for increasing the availability of the database tier is through the use of parallel database systems. Parallel database systems have multiple database processes accessing the same data. If one database process fails, the client can be switched to another process. Physical implementation is possible using either a shared nothing approach or a share everything approach for data storage resources.

Each of these solutions relies on time consuming transaction log recovery/reconciliation before another database process can take over for the failed process. In addition, these approaches tend to require special hardware/software solutions to enable processes executing on different machines to access any shared resources.

Various methods for implementing replicated database systems include active replication and primary/backup replication. Active replication delivers update requests in the same order to all the databases. One disadvantage of this approach is that the states of the individual databases may diverge due to the non-deterministic nature of transaction processing. A primary/backup approach processes transactions and checks its state to one or more backups. This approach may resolve non-determinism issues for parallel processes because only the primary actually executes the transactions.

One disadvantage of traditional primary-backup methods is that they assume a unique primary at all times. This is difficult to ensure in practice, gives rise to conservative timeout values for detecting the crash of a primary, and cannot handle network partitions.

SUMMARY OF THE INVENTION

Methods and apparatus for enabling fast failover in a database tier of a three tier asynchronous network comprising at least one database client and a plurality of database servers are provided.

One method of processing transactions includes the step of concurrently processing a plurality of transactions including a selected transaction on a current primary of the plurality of database servers. Each transaction is broadcast to the remaining database servers for serial execution in an order determined by the order in which the current primary encountered their respective commit requests. The transaction is executed on all remaining database servers as long as the identity of the current primary has not changed. The transaction is committed on every database server if the identity of the current primary has not changed throughout execution. The committed result is returned form at least one database server to the database client.

Another method includes the step of receiving a transaction from the database client by a first database server identified as a primary for execution. Every transaction is initiated on the database server identified as the primary during an initial epoch. The transaction is processed on the first database server while the first database server is identified as the current primary. The transaction is broadcast to all database servers in response to a commit request of the transaction. The transaction is committed on the first database server if the first database server has been the primary exclusively throughout the transaction execution. The broadcast transaction is executed by any receiving database server that is not the primary. The broadcast transaction is committed on the receiving database server if the epoch of the received transaction is the same as a current epoch that identifies the current primary.

Another method includes the step of concurrently executing a plurality of transactions including a selected transaction on a first database server during an epoch exclusively identifying the first database server as a primary. The selected transaction is committed on the first database server in response to a commit request of the selected transaction if the commit request is encountered before the epoch is changed. The selected transaction is broadcast to a second database server upon receipt of the commit request. The selected transaction is non-concurrently executed on the second database server as long as the epoch is not changed. The selected transaction is committed on the second database server if execution is completed and the epoch has not changed.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 4 illustrates a pseudo-code representation of the methods of FIGS. 2–3.

FIG. 10 illustrates a pseudo-code implementation of one embodiment of the processes of FIGS. 5–7.

FIG. 11 illustrates a pseudo-code implementation of one embodiment of the processes of FIGS. 8–9.

DETAILED DESCRIPTION

Figure 1:
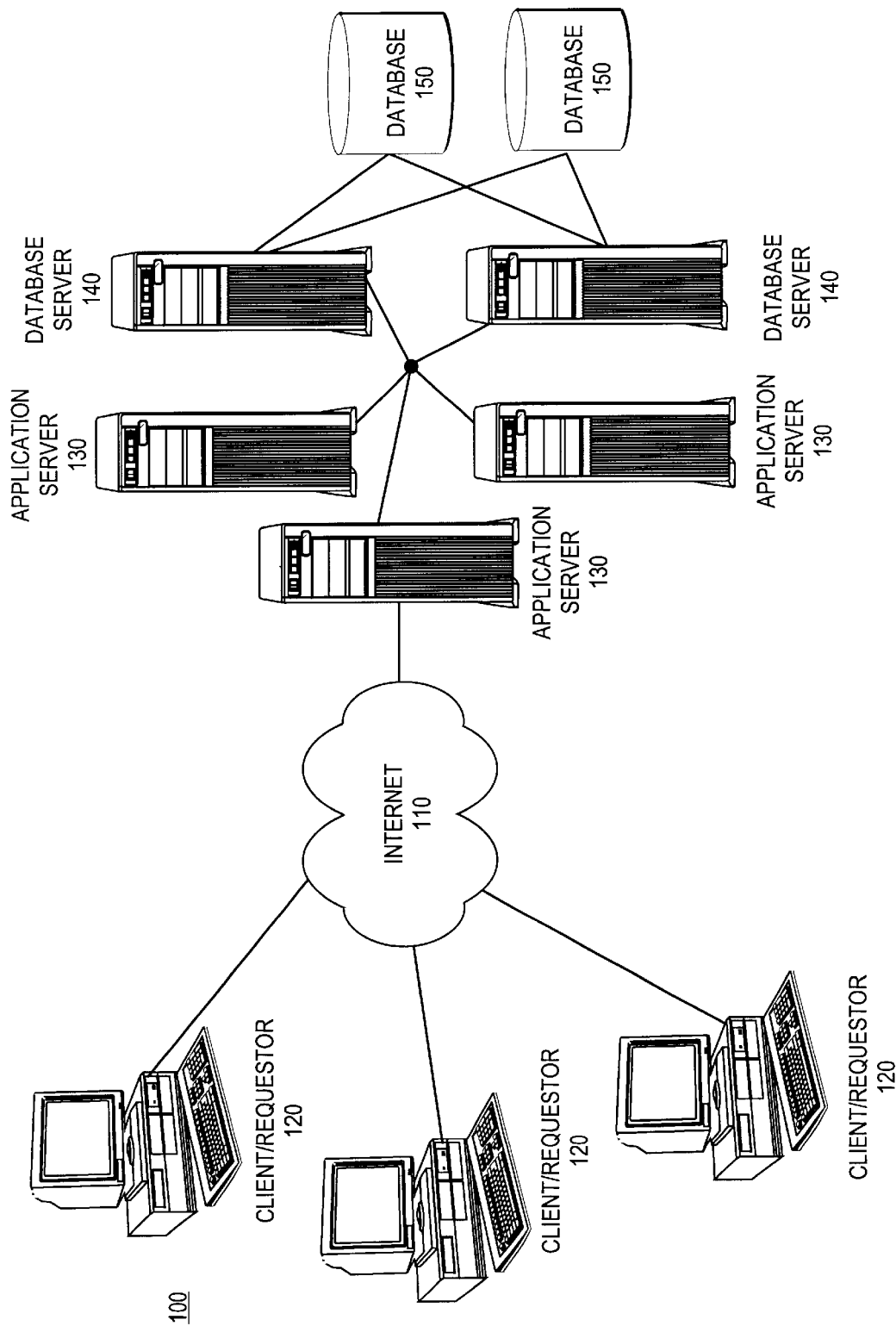
FIG. 1 illustrates a three tier transaction processing system.

FIG. 1 illustrates a three tier transaction processing architecture 100. The three tier architecture is a distributed architecture and has become a prevalent architecture in Internet commerce. Client/requestors 120 represent the first or top tier of the architecture. The first tier provides end-users with a front-end interface to the application servers 130. The front-end interface includes the user interface and related services such as session, text input, dialog, and display management. For Internet applications, the front-end interface is typically realized using a software application referred to as a "browser" that is executing on the client machine 120. The browser application provides a graphical user interface that enables the user to navigate to and request different resources accessible through the Internet.

The second or middle tier represented by application servers 130 provides process management where the business logic is executed. Validation of a client-issued request, for example, is one example of processing handled by the application server. The middle tier also provides functions such as queuing, application execution, and database staging. A communications medium such as the Internet 110 enables client/requestors 120 to issue requests to one or more application servers 130. The application server 130 is typically handling requests from multiple users in an asynchronous manner. The application servers are stateless, but may have side-effects on the databases 150.

The third or bottom tier includes databases 150 and database servers 140 which are collectively referred to as the database servers unless explicitly indicated otherwise. The third tier provides database management services including data locking, consistency, and replication services to ensure that data is consistent throughout the distributed environment. The application servers 130 execute database queries and updates to databases 150 through database servers 140. After processing a client-issued request, the application server returns the result to the appropriate client/requestor.

Clients may be denoted $c_1, c_2, \ldots c_n$ ($c_i \in$ Clients). Requests are issued by clients to one or more applications servers. Individual application servers are referred to as $a_i$ where $a_i \in \{a_1, a_2, \ldots a_n\}$ (i.e., ($a_i \in$ Application Servers)). The application servers are stateless. Thus they do not maintain states across request invocations. Requests have side-effects on the databases but not on the application servers. Advantages of stateless application servers include fast fail-over because there is no need to restore or recover a state. Stateless servers also enable free migration.

Individual database servers are referred to as $d_i$ where $d_i \in \{d_1, d_2, \ldots d_n\}$ (i.e., $d_i \in$ Database Servers). Each database server maintains a copy of all stored data items. Processes only fail by crashing. The application and database servers act cooperatively to implement primary/backup asynchronous database replication.

Application and database servers have access to failure detectors. Although failure detection is not required to be perfect at all times, failure detection is presumed to eventually be complete and accurate. Every database server that crashes is eventually suspected of crashing (i.e., completeness). There is a time after which a database server that has not crashed is not suspected of crashing (i.e., accuracy).

Communication between servers is represented by the primitives send and receive. In addition, the database servers communicate with each other using a broadcast mechanism. Broadcast communication is represented by the primitives broadcast(m) and deliver(m) and conducted in a manner that ensures agreement between database servers and total order with respect to all transactions. If a database server delivers a message m, then all database servers that do not crash (or that crash and successfully recover from the crash) eventually deliver the message m (agreement). If two database servers $d_1$ and $d_2$ both deliver messages $m_1$ and $m_2$, then $d_1$ delivers $m_1$ before $m_2$ if and only if $d_2$ delivers $m_1$ before $m_2$ (total order).

A transactional job abstraction is used to model the business logic handled by the application servers. The application server acts on a received client request. In order to address the client request, an application server typically performs various computations according to business logic before submitting a formulated database request to the primary database server.

The application servers access the databases by submitting transactional jobs. The execution of a job results in the generation of one or more requests to be executed by the database servers. In one embodiment, these requests include structured query language (SQL) statements. Thus, a transactional job models business logic that may contain a number of SQL statements. Submission of a job from an application server is represented by the primitive submit (job). The primitive response(result) returns the result of the job.

The use of transactional jobs rather than individualized SQL statements provides transparency and masks failures relative to the application server. If SQL statements were otherwise submitted individually and a failure occurs, re-submission of the same statements because the business logic that submits the statements might select alternative statements based on the non-deterministic results returned by previous statements.

The primary database server returns a pre-commit results of the requests to the application server. The pre-commit results are non-deterministic because the values depends on the database state. In the case of an airfare reservation request, the pre-commit result might include flight itinerary, price, confirmation number, seat location, etc. To simplify the example, a returned pre-commit result is presumed to be non-nil so that user-level errors are treated as ordinary result values. A user-level error would occur, for example, when reservations cannot be made because the flight is booked to capacity.

Processing of transactions at the database server level is abstracted by a number of primitives. Each transaction, t, must be initiated with a begin(t). The database issues a response, response(t) once ready to process t. The parameters associated with the primitive include the identity of the transaction, t. The symbol "-" used as an individual parameter represents one or more values that are not particularly relevant to the discussion.

The primitive exec(t, sql-st) requests the execution of a database command statement (excluding commit and abort commands) as part of transaction t. In one embodiment, the databases are relational databases accessed via structured query language (SQL) statements or commands.

All database transactions are terminated in one of two states: committed or aborted. To simplify the discussion, a user-level error (e.g., such as no seats available for a particular flight in a flight reservation system) is returned to the client indicating that the result has been committed even though no modification may have actually been committed to the database. From a database perspective the result is still "committed." Transaction termination helps to prevent resource blocking situations at the application and database tiers. The non-blocking property is necessary to ensure that a database will eventually re-allocate resources that have been locked pending an aborted or committed outcome by the database servers.

Each transaction passes through a series of states until termination. Once initiated, a transaction is in an "executing" state. Once a commit is requested, the transaction is "committing." If the commit is successful, the transaction is terminated in a "committed" state. Whenever a transaction is aborted, the state of the transaction is "aborted." A transaction must proceed from "executing," to "committing," to "committed" for termination in a successful commit. Once committed, the transaction state cannot change to aborted. However, the transaction state may change to "aborted" from either "executing" or "committing."

The commit primitive terminates a sequence of execs for a given transaction, t, and requests t's committal. If t cannot be committed, the database server is presumed to have crashed.

The abort primitive terminates a sequence of database requests associated with transaction t. Although a confirmation response is generally returned for each and every database action requested by the application servers, no confirmation response is expected after an abort command.

A transaction thus consists of a finite sequence of database requests and responses starting with begin and terminating with either a commit and response or an abort (e.g., {begin (t); response(t, -); exec(t, -); response(t, -); . . . [(commit(t); response(t -))|abort(t)]}).

Clients submit requests to the application servers and wait for the outcome or result of the requests, but are not otherwise involved in the failover protocol. This relieves the client from having specific knowledge of the third tier. Clients are able to communicate with databases only through application servers. The application servers interact with the database servers to execute transactions on behalf of clients.

Figure 2:
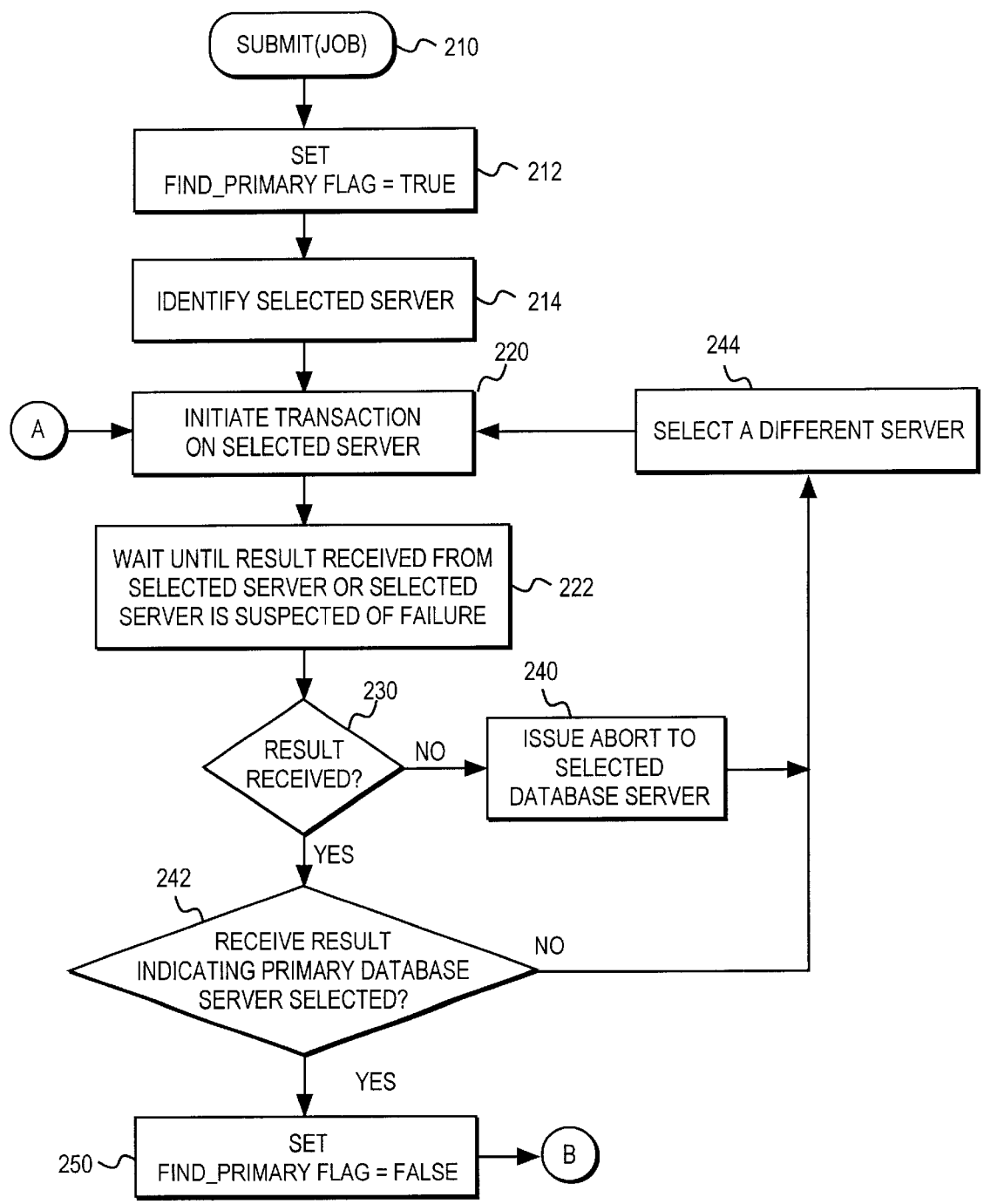
FIG. 2 illustrates a method performed by an application server for selecting a database server.

FIG. 2 illustrates steps performed by the application server once a job is ready for submission beginning with step 210. The identity of the primary database server is not always known at all points in time by the application server, particularly whenever a failover condition has arisen. A trial and error technique is used to identify the primary server. The Find_Primary flag is used to indicate when a search must be initiated for the primary database server. The Find_Primary flag is set to True in step 212. An initial guess as to the identity of the primary server is performed in step 214.

Step 220 attempts to initiate the transaction execution sequence on the selected server. This is accomplished by selecting the first request within the transaction (i.e., begin (t)) and sending it to the database server. Eventually either a result will be received from the selected server or the selected server will be suspected of failure. The process effectively waits (step 222) until one of these events has occurred. Step 230 determines whether the event is a received result. If not then the selected server is suspected of failure and step 240 issues an abort as a precautionary measure. If the database server has failed then the abort command is either unnecessary or may otherwise be inoperative.

The process of identifying failed database servers, however, is permissibly prone to error (i.e., false positives are accommodated). To guard against the case in which the selected database server is falsely suspected an abort command must be issued. Whether correctly or incorrectly suspected of failure, a different database server is selected in an attempt to locate the current primary database server in step 244.

If the event is a received result, then step 242 determines whether the result indicates that the selected server is the primary database server. If not, then another database server is selected in step 244.

Steps 220–244 are repeated until the primary database server has been located. Once the primary database server is located, the Find_Primary flag is reset to False in step 250.

Figure 3:
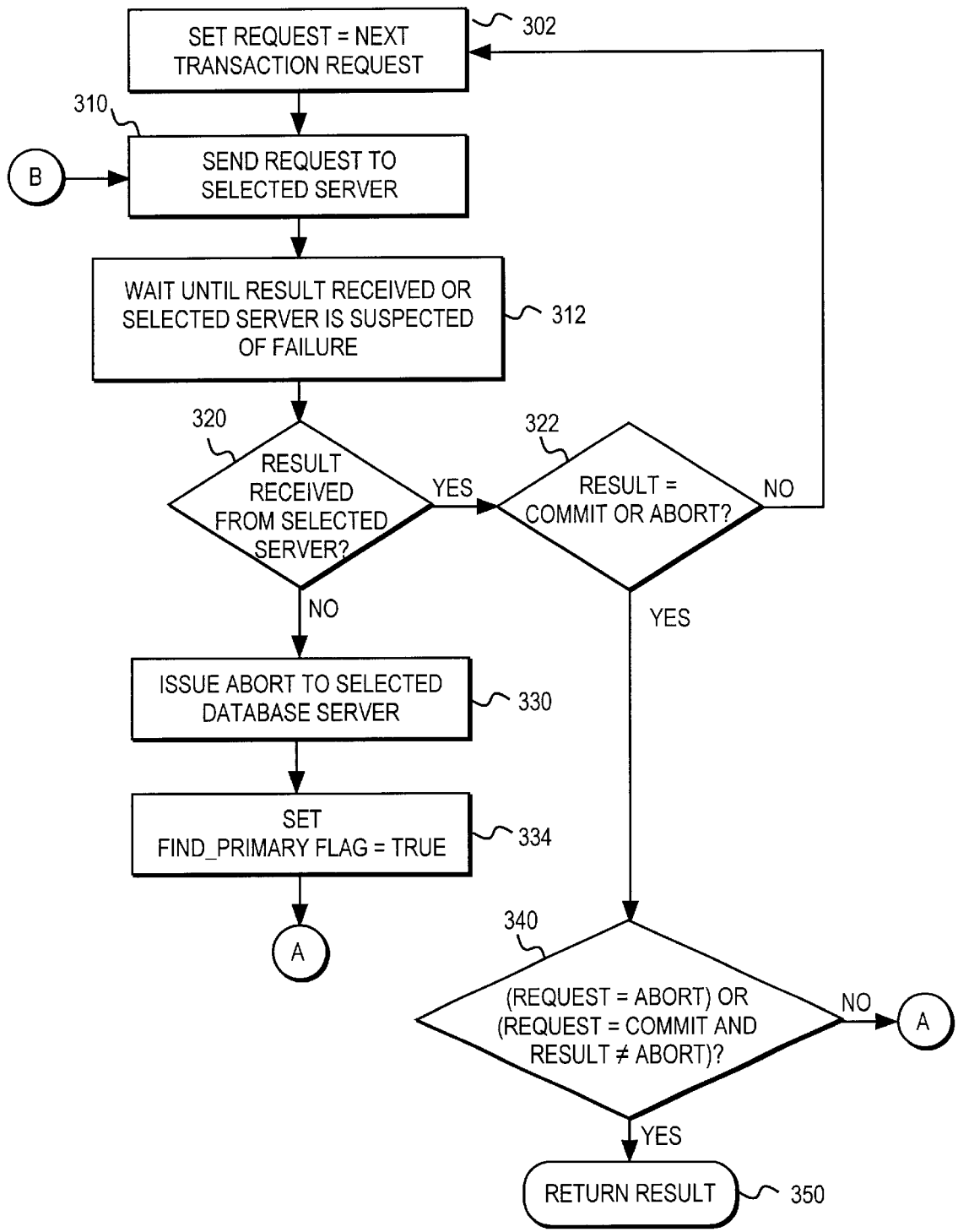
FIG. 3 illustrates a method of handling execution of the transaction on the selected database server from the perspective of the application server.

After the primary database server has been located, the application server can attempt to execute the job. FIG. 3 illustrates the execution of the job once the primary database server is identified.

Step 302 identifies the next request to be processed within the list of requests forming the transaction. The set variable contains this to-be-processed request. In one embodiment, the result returned from execution of the previous request is used to identify the next request of the transaction.

Step 310 sends the request to the selected database server. As before, either a result will be received or the selected server will be suspected of failure. Step 312 waits until one of these two events has occurred.

Step 320 determines whether a result has been received from the selected server. If not, then the application server assumes that the selected server is no longer the primary database server. In step 330 an abort command is issued to the selected database server in case the selected database server is falsely suspected of failure. The Find_Primary flag is set to True in step 334 to indicate that the current primary database server must be located. Processing then continues with step 220 of FIG. 2.

If step 320 determines such a result has been received, then step 322 determines whether the result is one of a commit or an abort. If the result is neither of these, then processing continues with step 302 to handle the remainder of the transaction. Otherwise processing continues with step 340.

If the request is an abort, or if the request is a commit and the result is not an abort, then the transaction is completed and the result is returned in step 350. Otherwise, job processing continues with step 220 of FIG. 2.

FIG. 4 illustrates a pseudo-code example for implementing one embodiment of the method of FIGS. 2–3. Lines 1–13 of pseudo-code 410 deal with locating the primary server. Lines 15–25 deal with executing a transactional job and returning the result.

Initially the application server selects one database server (lines 6–7), attempts to start the transaction on the selected server (line 8), and waits until receipt of an answer or a determination that the database server has crashed (line 9). If the application server suspects the database server has crashed (line 10), the application server selects another database server and tries to start the transaction on the newly selected database server. The application repeats the process of identifying another database server and retrying the transaction until a result is received from the primary database server (line 12). The Find_Primary flag is set to False (line 13) to indicate that the current primary has been found.

Once the primary database server has been identified and a result has been obtained for the initial request (i.e., begin(t)), the application server identifies the next request to be sent to the primary database server (line 16). In one embodiment, the result of the previously executed request is used to identify the next request to be executed. Thus job(result) returns the next transaction request After sending the request (line 17), the application server waits until an answer is received or a determination that the primary has crashed (line 18).

If the primary is suspected of crashing, the application server will send out an abort request just in case of a false suspicion (line 20). The application server then sets the result to indicate the request was aborted (line 21) and sets the Find_Primary_Flag true (line 22) to indicate that the primary database server must be identified again. (In case of a false suspicion the application server would cycle through the other database servers again until locating the falsely suspected server as the primary if no subsequent failures have occurred.)

Steps 15–22 are repeated (line 23) until either a commit or abort result is obtained. Line 24 ensures that the entire transaction will be retried until the transaction is affirmatively terminated through an abort request or successfully completed as indicated by a commit request and a result other than abort. Once either of these conditions occurs, the result is returned.

If the primary database server aborts the transaction, the application server loops back to line 4 to retry the transaction from the beginning using the same database server. If the transaction is aborted by the application server as a result of a suspected failure, the application server loops back to line 4 to retry the transaction from the beginning after identifying a new primary.

Figure 5:
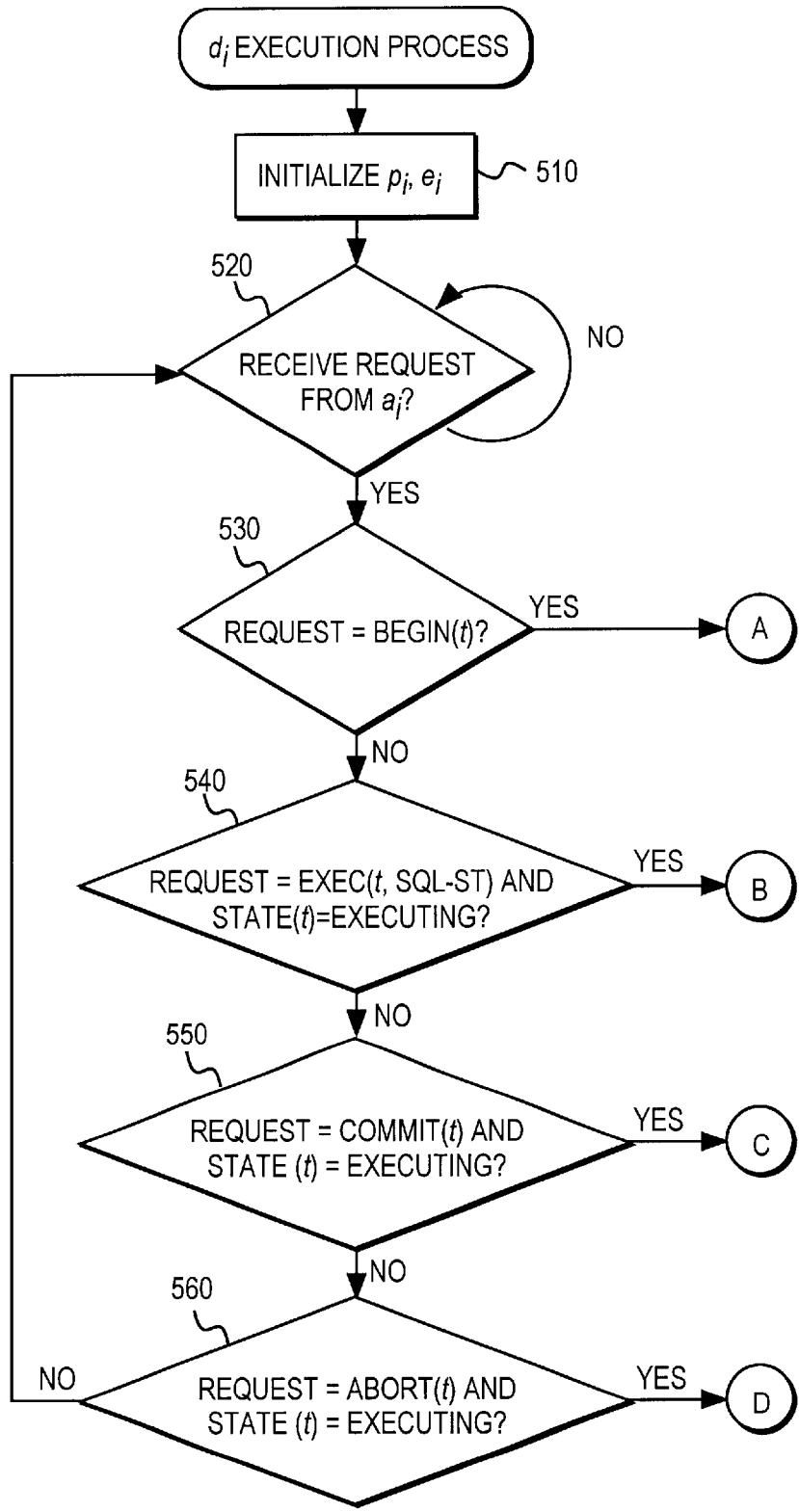
FIG. 5 illustrates a method of executing the transaction from the perspective of the database server.

FIG. 5 illustrates the initialization and transaction execution process performed by the database servers. Database transactions are handled during "epochs". Each epoch uniquely identifies a database server that is the primary database server for that epoch. When a primary database server is suspected of failing, a change of epochs results in a change of primary database servers.

Each database server ($d_i$) will initialize the variables corresponding to the presumed current epoch ($e_i$) and primary ($p_i$) as indicated in step 510. The database servers thus agree initially on the current epoch and primary. All database servers that have not failed will continue to agree throughout execution because messages are delivered in the same order to every database server.

The database server cannot execute a transaction until receipt of a request from an application server, $a_i$ as indicated in step 520. The database server transaction execution process will proceed along any one of a number of paths depending upon the nature of the received request.

Figure 6:
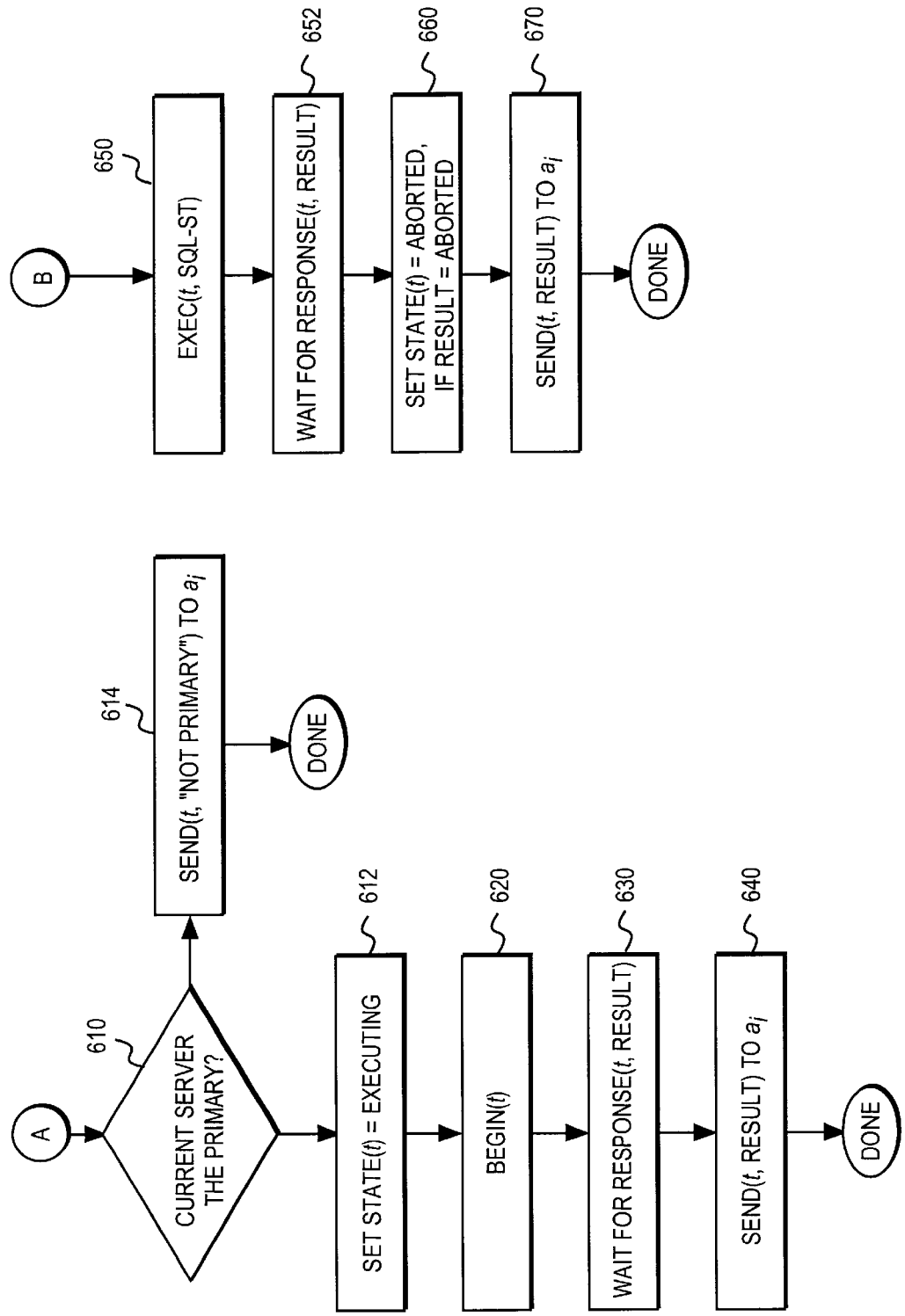
FIG. 6 further illustrates the method of claim 5.

Step 530 determines whether the request is a begin statement indicating the start of transaction, t. FIG. 6 illustrates the steps to be performed in response to a begin statement. Step 610 determines whether the current database server, $d_i$, is also the primary database server (i.e., $d_i=p_i$). If the current database server is not the primary, then step 614 notifies $a_i$, that the selected database server is not the primary. If, however, the current database server is the primary, then step 612 sets a state variable indicative of the stage of transaction execution. The transaction state is set to indicate that the transaction is executing. A begin(t) statement is executed in step 620 to initiate the transaction. The process then waits until a result is received as indicated in step 630. Step 640 sends the received result to $a_i$.

Figure 7:
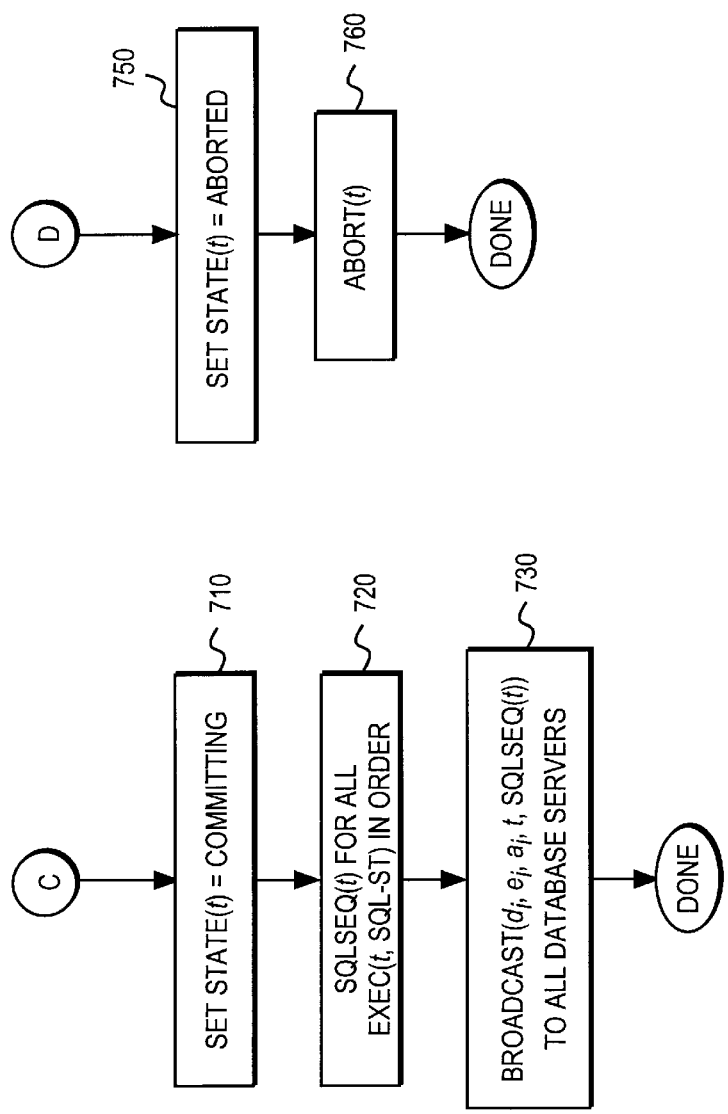
FIG. 7 further illustrates the method of claim 5.

Referring back to FIGS. 5–7, the transaction may be executing as determined by step 540. If so, the request is executed in step 650. The process waits until a response is received in step 652. If the result of the response indicates that the transaction has been aborted, then step 660 sets the transaction state to aborted. The result is then returned to the application server, $a_i$, in step 670.

If a commit request is received and the transaction state is executing (as determined by step 550), database server $d_i$ sets the transaction state to committing in step 710 before performing an orderly SQLSEQ(t) for all the executed SQL statements in step 720. SQLSEQ(t) presents all the SQL statements in sequential form as ordered by the primary. The primary then broadcasts its identity ($d_i$), the epoch identity ($e_i$), the transaction identity (t), and the ordered SQL statements for the transaction (SQLSEQ(t)) to all other database servers in step 730.

Referring back to FIG. 5, step 560 handles the case when the transaction is being executed and a request to abort the transaction is received. In such a case, the primary changes the state of the transaction to aborted in step 750 before issuing an abort command in step 760. This would be the path taken if the application server originated the abort request. Aborts initiated by the databases during transaction execution are handled in step 660.

Figure 8:
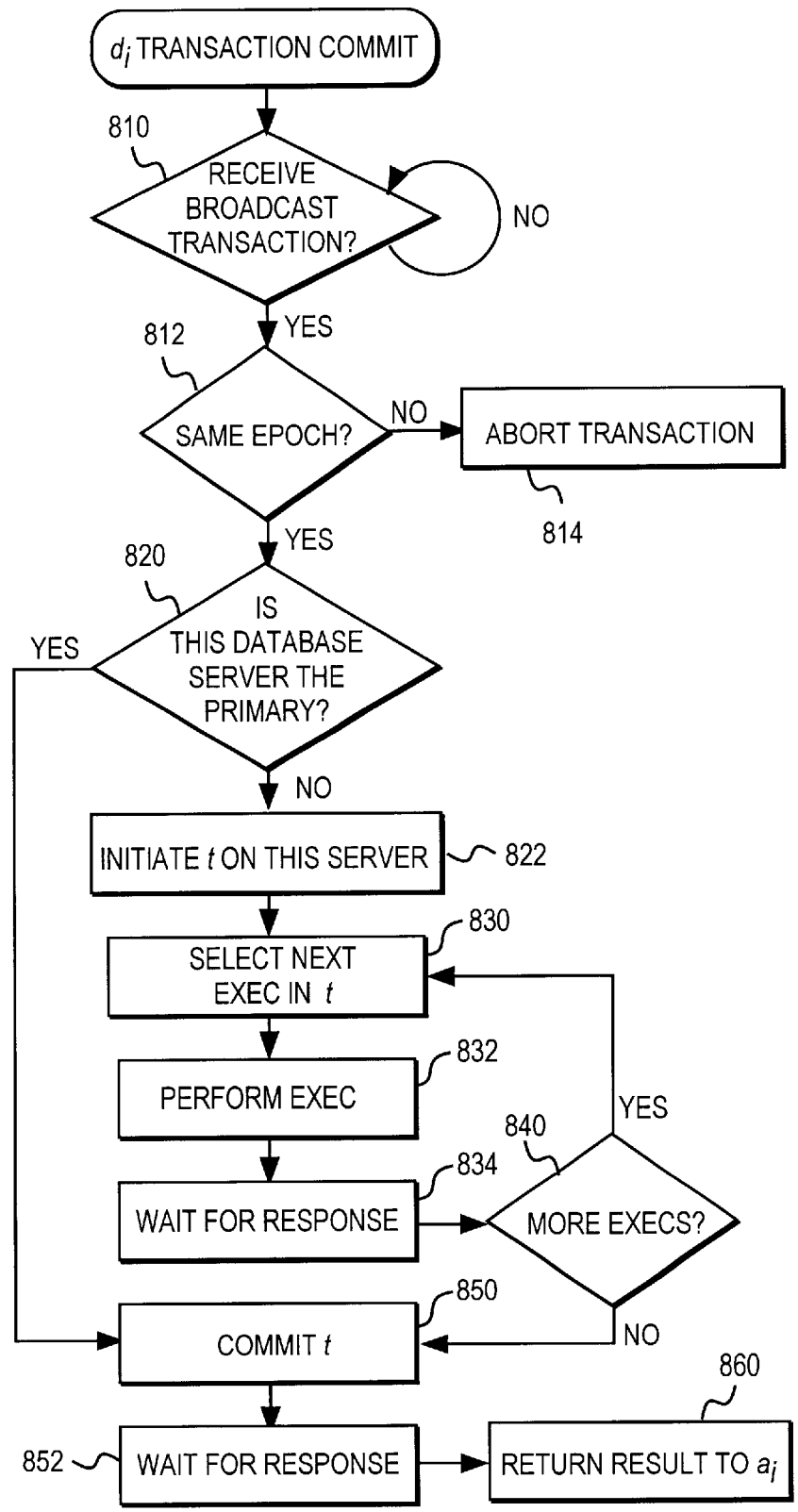
FIG. 8 illustrates a method of committing the transaction in accordance with the current epoch.

FIG. 8 illustrates the process executed by the database servers for committing an executed transaction. The commit process is dormant until receipt of a broadcasted transaction as indicated in step 810. If the execution epoch indicated by the broadcast transaction is not the same as the current epoch as determined by step 812, then the transaction is aborted in step 814. The execution epoch represents the epoch as determined by the primary database server at the time the transaction was executed by the primary. The epoch is used for validation. No transaction will be committed unless the commit process is requested during the same epoch that the transaction requests were executed in.

If the execution epoch is the same as the current epoch, step 820 determines whether the current database server ($d_i$) is the primary ($p_i$). The state of the primary has already been provisionally changed by the prior uncommitted execution of the transaction. If the present server is the primary, then the database server (i.e., the primary) issues a commit command in step 850 and waits for a response in step 852. The result including whether the transaction was successfully committed is returned to the originating application server, $a_i$, in step 860.

The transaction must still be executed by all database servers other than the primary. Thus, the transaction is initiated on the current server in step 822 if step 820 determines that the current server is not the primary. Initiation consists predominately of issuing a begin(t) command. Steps 830–840 iteratively process each of the SQL statements of the transaction in order. Step 830 selects the next EXEC statement from the transaction. The EXEC is performed in step 832. Step 834 waits until a response is received. Steps 830–840 are repeated until there are no more EXECs to be performed as determined by step 840. The transaction can then be committed in step 850. Once a response is received in step 852, the result is returned to the originating application server, $a_i$.

Figure 9:
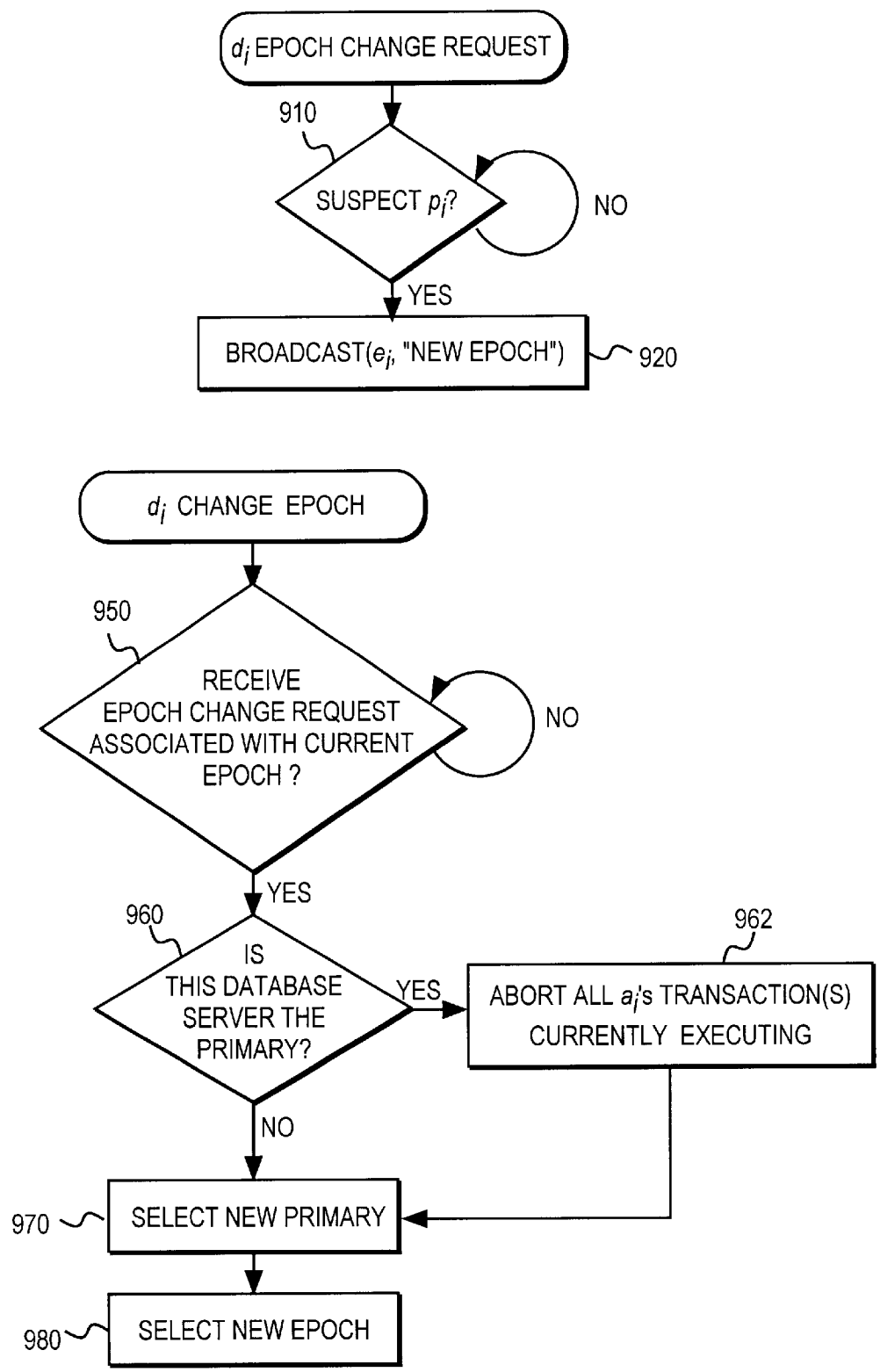
FIG. 9 illustrates a method of generating an epoch change request and a method of responding to an epoch change request.

FIG. 9 illustrates methods of requesting an epoch change and responding to a requested epoch change. Whenever a database server suspects that the primary, $p_i$, has failed as determined by step 910, an epoch change request is broadcast to the other database servers as indicated by step 920. The identity of the current epoch, $e_i$, accompanies the epoch change request.

Each database server responds to the broadcast change epoch request, if the identity of the current epoch indicates that a change has not been acted upon. In particular, steps 960–980 are only performed in response to a change request when the current epoch matches the epoch indicated by the epoch change request as indicated in step 950.

If the database server receiving the change epoch request is the primary as determined by step 960, then the primary must attempt to abort all transactions not yet in the process of committing.

Once the conditions of step 950 are met and after terminating the execution of any transaction still being executed (in the event the current database server is the primary), the current server identifies a new primary database server in step 970. The current server then selects the next epoch in step 980. In one embodiment, the epoch and primary are identified by numbers that can be incremented to effectuate selection of another epoch or primary, respectively. In one embodiment, a change epoch broadcast includes the epoch number for the new epoch.

FIGS. 10–11 illustrate a pseudo-code implementation of the methods of FIGS. 5–9. Referring to FIG. 10, lines 1–3 initialize $e_i$, and $p_i$ as indicated in step 510. Lines 5–27 illustrate transaction execution corresponding to steps 520–560 of FIG. 5 and the corresponding steps of FIGS. 6–7. A state variable (state(t)) is used to track the progress of each transaction. The state variable has one of a least three mutually exclusive values to indicate that a transaction is a) executing, b) aborted, or c) committing.

The SQLSEQ(t) statement in line 23 represents a sequentially ordered list of all the executable SQL statements for transaction t. Requests from different application servers may execute concurrently and be sequentially ordered in an arbitrary manner by the executing database server. The goal is to determine the sequential order of execution by the primary and enforce the same order at the backups by avoiding concurrency at the backups. Formerly concurrently executed transactions are sequentially broadcast by the primary in requested commit order in order to ensure the same outcome (i.e., state consistency) with the backups. The order of the statements within SQLSEQ(t) reflects the sequential order of execution by the primary.

Lines 27–42 of pseudo-code 1110 of FIG. 11 correspond to the commit transaction process of FIG. 8. Upon receipt of a broadcast statement (line 28) identifying an originating database server, an execution epoch, the originating application server, the transaction (or transaction identifier), and the collection of database requests to be processed, the received execution epoch is compared with the current epoch as determined by the receiving database server (line 29). In one embodiment the operator for the comparison test is "≠". Other tests (e.g., "<") may be used depending upon the particulars of implementation.

If the comparison indicates that the epoch has changed since the transaction was executed on the primary, then the transaction must be aborted. This is accomplished by updating the state of the transaction to aborted and issuing an abort command for the transaction (lines 30–31). Otherwise (assuming the current database server is the primary) the transaction may be committed in lines 39–42. In order to commit, a commit command for the transaction is issued and the database server waits for a response including the result. Once the result is received, the state is set to committed and the result is sent to the originating application server.

If the current database server is not the primary (i.e., $d_i \neq p_i$), the transaction must still be processed on the current database server as indicated in lines 32–38 before the actual commit. This is accomplished by setting the state of the transaction for the current database server to "committing" and then initiating the transaction with a begin statement (lines 34–35). Each SQL statement in the SQLSEQ list is then sequentially processed as indicated in lines 36–38.

Any database server can initiate a change of epoch. Lines 44–46 illustrate that a request for a new epoch is broadcast whenever a database server suspects its associated primary, $p_i$. Lines 48–56 illustrate a database server's response to a received epoch change request. Generally, the current database server selects a new primary and a new epoch (lines 55–56). In the illustrated embodiment, the epoch is represented by a number and the next epoch is selected by incrementing the current epoch.

Before changing the epoch or primary, the current database server must first abort any "in progress" transactions if it is the primary. Lines 50–54 set forth the required steps. A transaction having an "executing" state is identified by the primary database server in line 51. The state of the identified transaction is set to "aborted" in line 52. An abort command is issued in line 53. The identity of the transaction and the result of abort are sent to the originating application server in step 54. Steps 51–54 are repeated for each transaction having the "executing" state.

Figure 12:
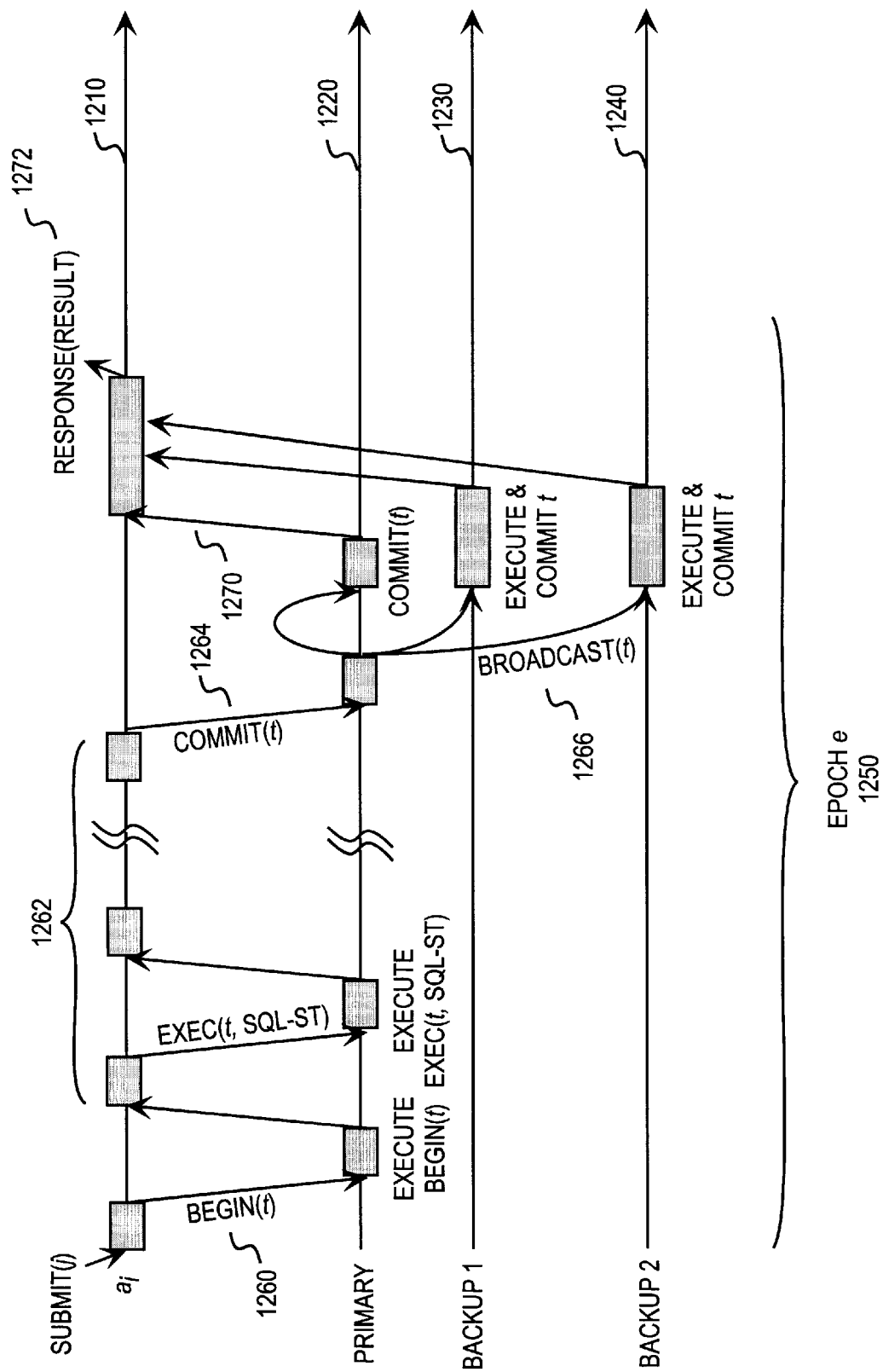
FIG. 12 illustrates primary/backup transaction processing without crashes or suspicions.

FIG. 12 illustrates a failure free transaction processing example. The application server process 1210 sends the begin(t) request (1260) of a submitted job to the primary database server process 1220. The primary database server executes the begin(t) statement to initiate the transaction. Upon acknowledgement of execution of the begin(t) statement, the application server process begins sequentially sending subsequent SQL statements (1262) for the transaction to the primary database server. This process is repeated until all transaction requests have been processed.

The application server then sends the commit (1264) to the primary. The primary broadcasts (1266) the entire transaction to all database servers. All backup database servers (1230, 1240) must execute and commit the transaction. The primary merely needs to commit the transaction. The results are returned (1270) to the application server which may then provide a response (1272) to the client. The entire transaction is executed and committed during a single epoch (epoch e 1250).

Figure 13:
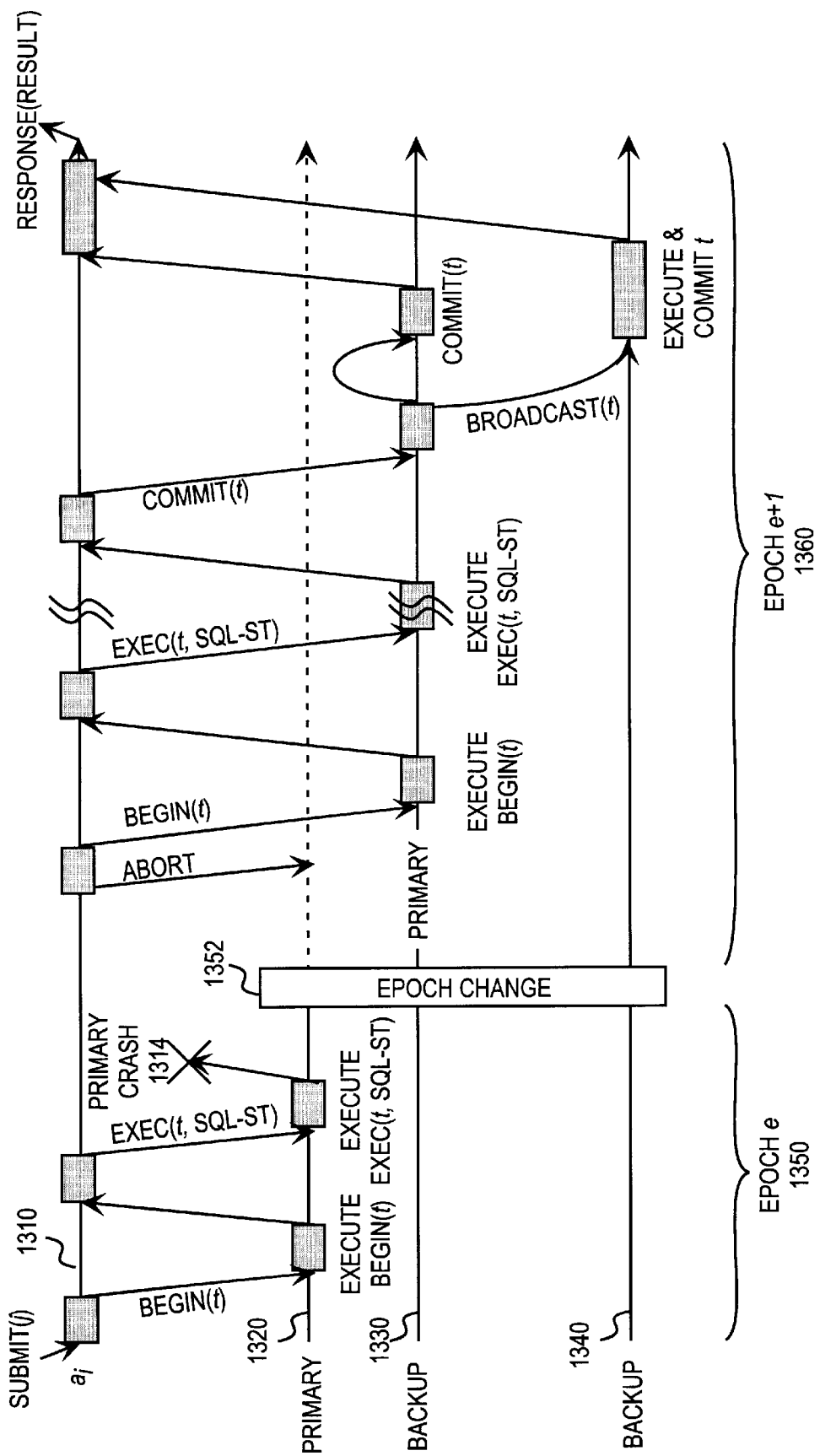
FIG. 13 illustrates primary/backup transaction processing in the presence of a crash/failure.

FIG. 13 illustrates transaction processing for a single transaction before and after an event necessitating a change of epoch. Although only a single transaction is illustrated for clarity, the primary database server may be concurrently handling multiple transactions for one or more application servers. Application server processing handles the transaction on application server thread 1310 during epoch e (1350) prior to a suspected primary crash 1314 as previously discussed. The primary and backup database server processes are illustrated as threads 1320 and 1330, 1340, respectively. The suspected failure of the primary results in an epoch change 1352. Backup 1330 is designated as the primary after the change of epoch (during epoch e+1 1360).

Application server thread 1310 sends an abort to the former primary database server 1310 in the event of a false suspicion and initiates processing of the transaction with the new primary database server 1330. If the application server has more than one transaction being executed, an abort will be sent for each transaction which may then be re-initialized on the new primary database server 1310. Moreover, each application server suspecting the primary will similarly issue an abort and re-initialize each of their respective executing transactions.

Transaction requests continue being processed until a commit request. In response to a requested commit from the application server 1310, primary 1330 broadcasts the pre-committed transaction to the backup database servers (e.g., 1340). Transactions are sequentially broadcast in "commit" order. A transaction executing concurrently with other transactions, for example, will be broadcast in response to its respective commit request. The first transaction encountering a commit request will be the first transaction broadcast. Similarly, the sequential broadcast order of the remaining concurrently executed transactions will preserve this commit order. This commit order is used regardless of whether the transactions are concurrently or singularly processed by the database server. As long as the primary is using two-phase locking, state consistency between the primary and backups is preserved.

In response to the commit request, primary 1330 then commits the transaction while backup server 1340 is executing and committing the transaction. The commit results are returned to application server 1310 which ultimately returns the result of the transaction to the client.

This approach enables a fast failover to a new primary database in a primary/backup database architecture. Moreover, product-specific transaction log recovery processes are avoided. As long as the databases support basic query languages, the primary/backup database tier may consist of database software from different vendors to form a heterogeneous database tier.

Although three tier architectures have been provided as examples for the multi-tier processes, the processes are applicable to other multi-tier arrangements as well. For example, the functionality of the client and application server may reside at a common tier such that the client and application server are effectively the same entity. Thus, for example, the multi-tier architecture might consist of only two tiers in other implementations. In all of these variations, the tier serviced by the database tier may be referred to as the database client. Accordingly, application servers are a subset of the class of database clients.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of processing transactions in a multi-tier network of at least one database client and a plurality of database servers, comprising:
   currently processing a plurality of transactions including a selected transaction on a current primary of the plurality of database servers;
   broadcasting each transaction to the remaining database servers for serial execution in an order determined by the order in which the current primary encountered a commit request of each transaction; and
   aborting execution of the selected transaction on any remaining database server that determines that the current primary is not the same as an initial primary that the selected transaction was started on.

2. The method of claim 1 further comprising:
   comparing a current epoch with an initial epoch associated with each transaction, wherein the initial epoch identifies the database server that the corresponding transaction was started on, wherein the current epoch identifies the current primary.

3. A method of processing transactions in a multi-tier network of at least one database client and a plurality of database servers, comprising:
   currently processing a plurality of transactions including a selected transaction on a current primary of the plurality of database servers; and
   broadcasting each transaction to the remaining database servers for serial execution in an order determined by the order in which the current primary encountered a commit request of each transaction;
   broadcasting a change epoch request if any database server suspects the current primary of failure, wherein each database server maintains an epoch variable that identifies one of the database servers as a primary.

4. The method of claim 3 wherein each selected database server performs the following steps in response to a received change epoch request
   selecting a new primary in response to the change epoch request, wherein the new primary is distinct from the current primary; and
   aborting each transaction executing on the selected database server, if the selected database server is the current primary.

5. A method of processing transactions in a multi-tier network of at least one database client and a plurality of database servers including a primary and a backup database server, comprising:
   receiving a transaction from the database client by a first database server identified as a current primary for execution, wherein each transaction is associated with an epoch uniquely identifying which of the database servers was the primary at the time the transaction was initiated; and
   processing the transaction on the first database server while the first database server is identified as the current primary.

6. The method of claim 5 further comprising:
   broadcasting the transaction to all database servers in response to a commit request of the transaction.

7. The method of claim 6 further comprising:
   receiving any broadcast transaction as a received transaction;
   executing the received transaction on the receiving database server, if the receiving database server is not the primary; and
   committing the received transaction on the receiving database server, if the epoch of the received transaction is the same as a current epoch that identifies the current primary.

8. The method of claim 7 further comprising:
   returning a committed result from each database sewer to the database client.

9. The method of claim 5 wherein the database servers support a structured query language command set.

10. The method of claim 5 wherein the plurality of database servers forms a heterogeneous collection.

11. A method comprising:
    concurrently executing a plurality of transactions including a selected transaction on a first database server during an epoch exclusively identifying the first database server as a primary; and committing the selected transaction on the first database server in response to a commit request of the selected transaction, if the commit request is encountered before the epoch is changed.

12. The method of claim 11 further comprising:

broadcasting the selected transaction to a second database server upon receipt of the commit request; and non-concurrently executing the selected transaction on the second database server as long as the epoch is not changed.

13. The method of claim 12 further comprising:

committing the selected transaction on the second database server, if execution is not completed and the epoch has not changed.

* * * * *